United States Patent Office 2,701,473
Patented Feb. 8, 1955

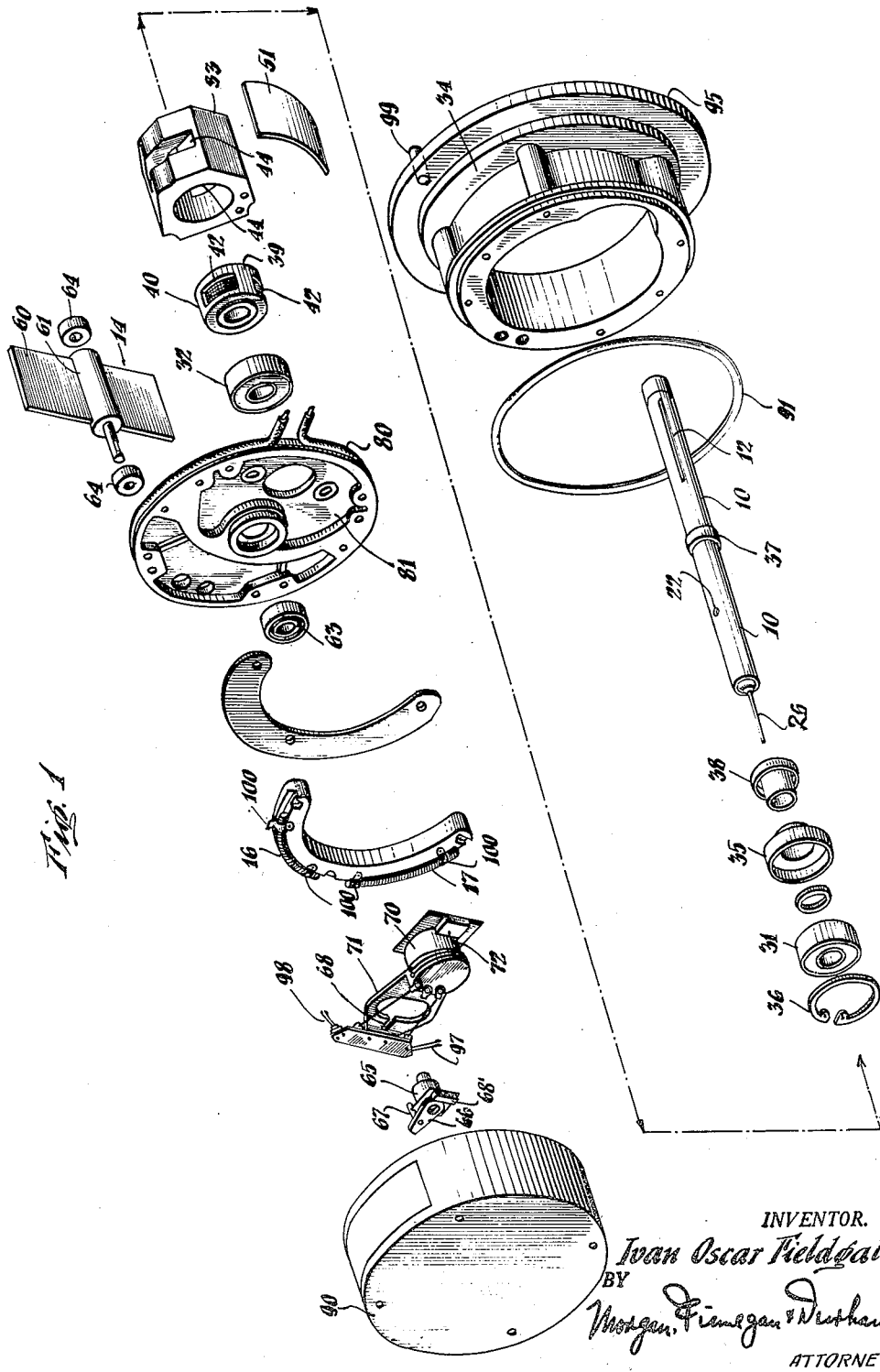

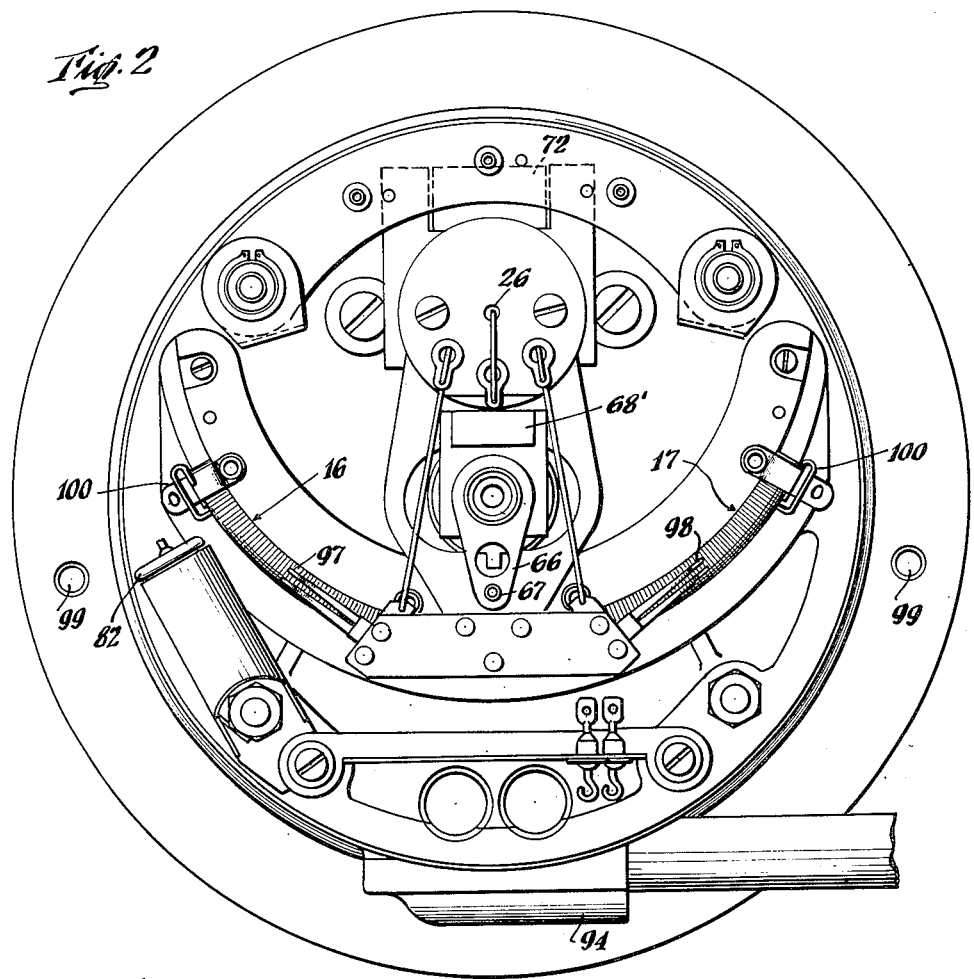
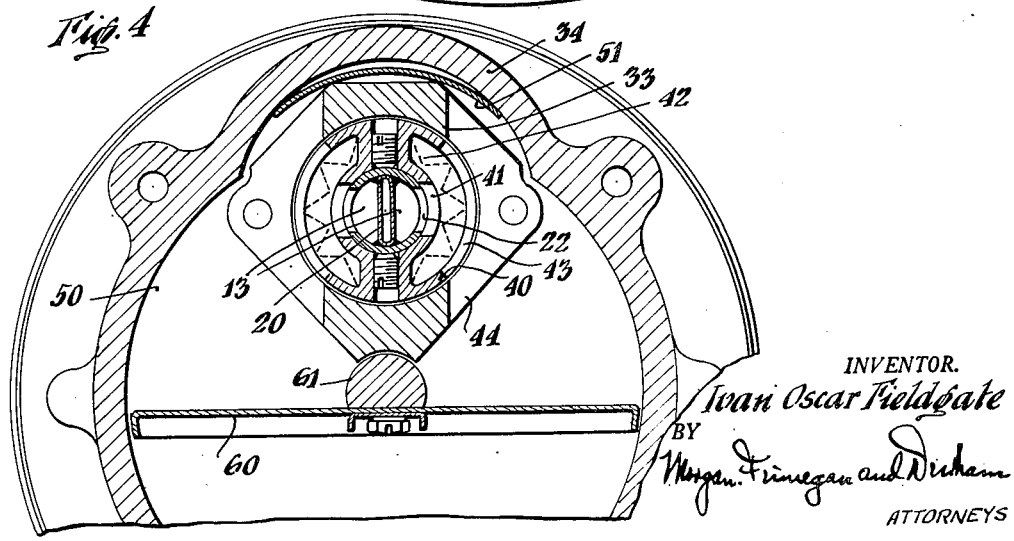

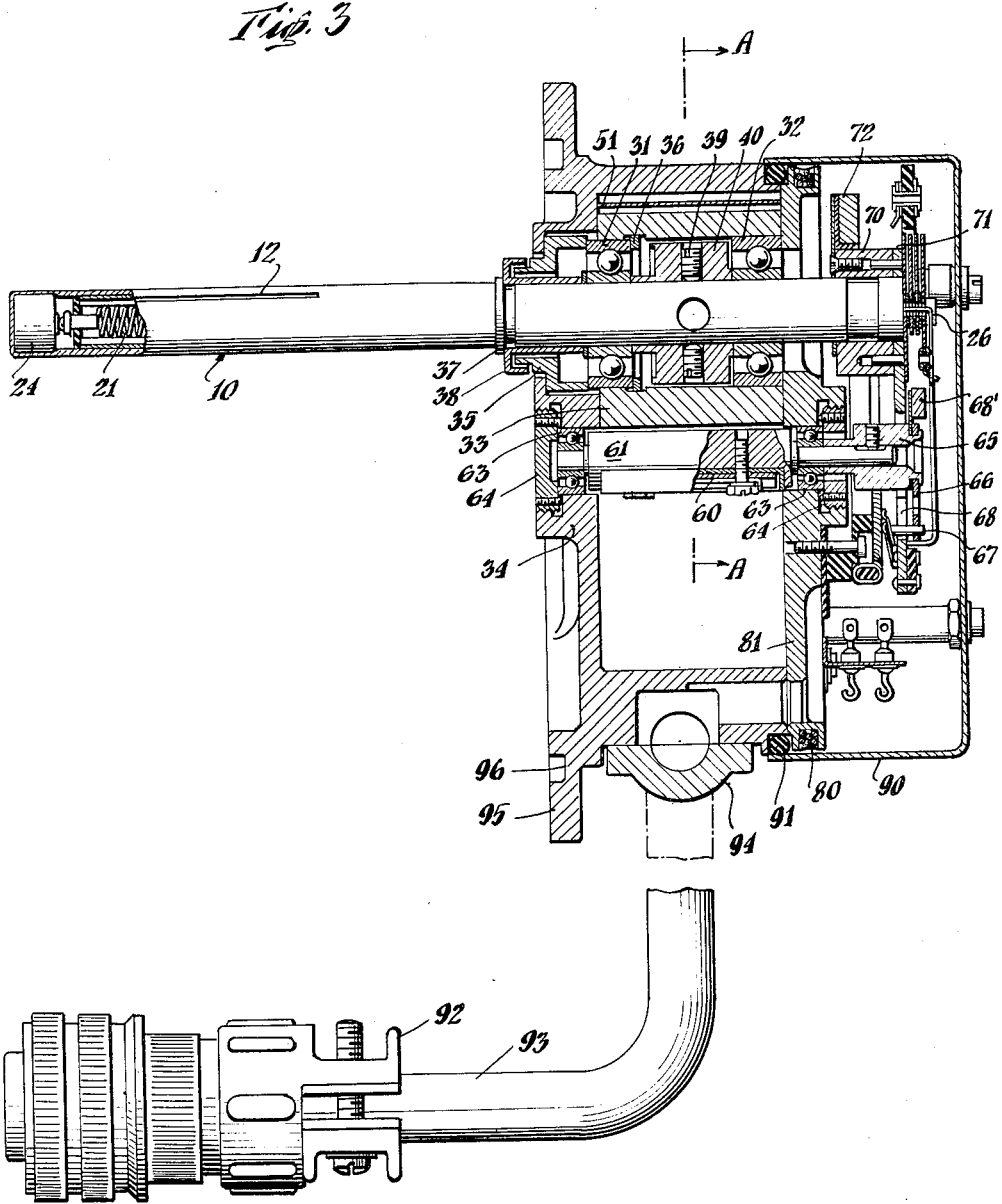

2,701,473

FLIGHT INSTRUMENT

Ivan O. Fieldgate, Hicksville, N. Y., assignor to Specialties, Inc., Syosset, N. Y., a corporation of New York Application December 11, 1952, Serial No. 325,362

Claims priority, application Great Britain January 2, 1952

8 Claims. (Cl. 73—188)

The present invention relates to novel and improved means for measuring the flight path of an aircraft relative to the aircraft's own axis. Specifically, the instrument can be used for measuring and indicating angle of attack, if installed horizontally, or measuring and indicating sideslip if installed vertically. The information may be supplied to the control mechanism of the airplane to insure stable flight along a predetermined path or supply visual indication of flight path to a crew member to facilitate safe flying.

More specifically, it is an object of the invention to be a source of angle of attack information to the pilot whereby he can fly more precisely and economically and make accurate landings in all conditions and yet avoid entering a stalled condition.

In United States of America Patent No. 2,445,746 issued July 20, 1948, to A. Raspet and assigned to Specialties, Inc., Syosset, New York, United States of America, there is disclosed a fluid stream direction indicator for aircraft use having an external probe member adapted to protrude into the airstream and angularly movable by the airstream to respond to fluid flow direction through the medium of two slots each communicating with a chamber of the instrument having a movable paddle which is swung in one or the other direction by the air entering one of said slots. The magnitude and direction of movement of said paddle is electrically indicated as a measure of direction of the airstream flowing past the probe.

The present invention makes use of an airstream direction indicator similar to that shown in said prior patent but with novel improvements of various particulars, as hereinafter brought forth, in order that it may function reliably in all ambient conditions as a unit in the system for detecting and indicating the flight path of an aircraft according to the instant invention.

As an illustrative embodiment of the present invention the system for angle of attack indication and stall warning may essentially comprise an airstream direction detector, a relay unit and an indicator unit. These components may be electrically connected to provide the pilot or other aircrew with first, a continuous visual indication of the angle of attack of the aircraft, second an indication by means of colored lights in a forward part of the aircraft of the angle of attack of the aircraft so that a ground observer, or particularly the landing signal officer of an aircraft carrier, can see the angle of attack of the incoming aircraft and thirdly, provide a signal to a stall warning device such as a vibrator motor on the control column when the angle of attack is dangerously high.

In combination these units comprise a highly sensitive system with controlled response rate showing the angle of attack of the aircraft. For such a purpose the probe of the airstream direction detector may be conveniently inserted to be perpendicular to the direction of flight and extend horizontally from a forward part of the fuselage.

The principle upon which the airstream direction detector described herein depends is that whenever there is an air current whose direction is perpendicular to the axis of a cylinder there is over the surface of the probe a pressure distribution which is symmetrical about the free stream air direction.

The airstream direction detector in its preferred embodiment comprises a cylindrical probe rotatable by a mechanism inside a housing which supports the probe. It is the purpose of the mechanism to measure the differential pressure between two symmetrically located slots in the probe and if this differential pressure is not zero to rotate the probe until such a condition exists. According to this invention the bisector of the acute angle between the slots is continuously oriented to be parallel to the direction of the local airflow without dependence on external power, such as electric power.

In a suitable configuration the probe is a hollow cylinder whose length is substantially greater than its diameter. Towards the outer tip of the probe there are two symmetrically located narrow slots whose length may conveniently be about one-quarter the length of the probe and whose angularly separated slots are about 90 degrees of arc apart. These dimensions are suitable but are not critical. The probe is divided internally by a hollow separator and near the base of the probe within the body of the instrument there are two orifices opposite one another in the cylinder wall. The orifices, separator and slots are arranged so that air entering or leaving either slot may pass through either passageway and through the orifice into the mechanism.

The hollow separator seals completely one passageway from the other and is designed to be in good thermal contact with the walls of the cylinder. Within the probe there is an electrical heating element of conventional form, which when energized, will maintain the surface of the probe free from ice under any condition of flight. The lower end of the heating element is connected to an insulated terminal which may be connected to an electric power supply and the circuit is completed to ground at the outer end of the probe through a temperature sensitive switch which opens whenever the probe temperature becomes excessive and closes whenever the temperature indicates danger of icing conditions.

At the base of the probe surrounding the orifices above mentioned are two filter elements to stop any dirt which might enter through the slots from passing through and clogging the mechanism.

With a probe as described above any differential pressure at the slots will result in a proportional differential pressure at the exit from the filter unit. Means are provided within the instrument whereby this differential pressure will cause the displacement of a servomotor which will in turn cause rotation of the probe in the appropriate direction to reduce to zero the differential pressure at the slots. This mechanism may conveniently be a paddle extending diametrically across and free to rotate about the axis of a cylindrical cavity, and so arranged that the same differential pressure which exists at the exit from the filter unit also exists across the opposite sides of the paddle. The bearing housing for the probe may suitably form the stationary member separating the two parts of the paddle chamber. The mechanical connection between the probe and the paddle servomotor may conveniently be a pin and slot linkage so that motion may be transferred from one to the other with the minimum backlash and friction.

It is considered an important feature of the design of the instrument that there is a minimum of pneumatic resistance between the slots and the servomotor so that there is not excessive loss of power due to pressure drop in the passageways and porting. However, it is essential that the relation between the resistance of the passageways, the capacity of the paddle chamber, and the inertia of the moving parts be correctly maintained to ensure stable operation yet rapid speed of response. The dimensions of the parts must be chosen to ensure sufficient power and provide adequate angular probe rotation, which may be 60 degrees of arc, to meet all conditions of flight.

Directly coupled to the base of the probe, but outside of the paddle chamber, means may be provided for remote indication of the angular position of the probe. This may conveniently be accomplished by attaching to the probe, through suitable insulation, the wipers of potentiometers mounted within the instrument.

In order to ensure interchangeability between various airstream direction detectors without any necessity for adjusting the systems to which they supply information, all units are adjusted at manufacture so that when the local airstream direction is at a known angle, such as 90 degrees of arc to the line between two reference marks (such as dowel pins on the outer mounting flange of the unit) then the wipers of the potentiometers or other electrical pickoff means are at a known point in the electrical and mechanical travel, usually the electrical and mechanical centers.

Thus provided that the mounting has two appropriately located holes which engage the reference dowel pins, then one unit can conveniently replace another without boresighting or adjustment. Further mounting provisions which are important features of the design comprise a flange which can make a pressure tight seal on a suitable mounting and a pressuretight case within the aircraft so that the instrument may be mounted in parts of the aircraft which have an internal pressure different from the static pressure at the probe location. By means of this seal, air flow through the unit is prevented. This avoids biasing its readings and there is no tendency in rain or dust for water or dirt to enter the mechanism.

It will be understood that the foregoing general description and the following detailed description as well are exemplary and explanatory of the invention but are not restrictive thereof.

Referring now in detail to the illustration of the invention as shown in the accompanying drawings there is provided a highly sensitive and accurate airstream operated instrument for determining the flight path of an airplane and for transmitting this information to other mechanisms which cause the airplane to be flown in the most efficient manner or shown a visual indication of flight path to the pilot, or both.

In the drawings, Figure 1 shows an exploded view of the principal parts of the instrument, together with projected center lines on the principal axes as an indication of the association of the parts. Figure 2 is a plan view, with the cover removed, of the inboard side of the instrument. Figure 3 is a central sectional view which shows the outboard probe at the left of the figure and shows the main portion of the instrument at the right of the figure and Figure 4 is a cross section taken on the line A—A of Figure 3.

In the illustrative embodiment of the instrument, there is provided a probe member 10 which is rotatable about its longitudinal axis, the probe member being formed with two narrow slots 12 which are parallel to each other and to the axis and communicate with passageways 13, whereby the air pressure applied to them in flight is transmitted to two parts of a motor chamber in which a paddle member 60 rotating on an axis parallel to the axis of the probe is connected by linkage to the probe to control the angular position of the probe and to rotate the probe until the pressure differential between the two slots has been reduced to zero.

The probe comprises a hollow cylindrical tube 10 which is divided into two semicircular passageways by means of a hollow separator member 20 which extends from end to end of the probe 10, the slots 12 being spaced equally from it, as are the orifices 22 through which air escapes from the hollow probe. Inside the hollow separator 20 there is a wire-wound electrical resistance heater 21, connected at the outer end to ground through the temperature sensitive switch 24 and connected at its inner end to a projecting terminal 26 which is insulated from the walls of the probe. When supplied with power at the proper voltage, the heater maintains the probe at a sufficiently high temperature to prevent accumulation of ice on the probe, such as might interfere with the pressure distribution around the probe.

Probe 10 is mounted on bearings 31 and 32 within the block 33 which is inside the housing 34. The housing 34 is mounted close to the skin of the aircraft so that the slots in the probe are in the airstream and clear of the boundary layer. The slots should be on the leading side of the probe.

The outer race of the bearing 31 is held against the inner dust shield 35 and both are loaded against the outer wall of the housing 34 by the retaining spring 36 which is located in a groove in the block 33. The probe 10 is held to the inner race of the bearing 31 by means of the shoulder 37 on the probe 10, the outer dust shield 38 and the set screws 39 in the filter assembly 40. The filter assembly 40 consists generally of two concentric cylinders with a wall across the interspace at each end of the cylinders and with a barrier across the interspace extending from end to end. The inner cylinder of the filter is arranged to have two holes 41 which match the holes 22 in the probe 10 so that air may pass from the probe to the filter elements 42 situated on either side of the two barriers within the filter housing 40. The mesh of the filter elements 42 is chosen so that no dirt particle which could pass through the element could clog or jam the mechanism. After passing through the filter element 42 air enters the paddle chamber 50 by means of slots 43 in the filter element and corresponding slots 44 in the block 33.

Extending across a diameter of the paddle chamber 50 there is a rectangular paddle 60 which is attached to the paddle shaft 61. The paddle 60 is dimensioned so that there is a small clearance on all sides between it and the walls of the paddle chamber 50 and also there is a small clearance between paddle shaft 61 and the block 33. These clearances are provided to ensure that the paddle 60 rotates without rubbing against the sides of the chamber 50 but the clearances themselves are small and the paddle 50 is flanged on all sides to obtain a high resistance leakage path across the paddle 60. It is a design feature of the instrument that the internal pneumatic resistance between one side of the paddle 60 to the other is substantially greater than the combined resistances of the slots 12 and the passageways in the probe 10. This feature prevents excessive pressure losses under dynamic conditions. To reduce further losses due to leakage across the paddle chamber the spring member 51 is fitted between the back of the block 33 and walls of the housing 34.

The paddle shaft 61 is mounted on bearings 63 with adjustable caps 64 for controlling the axial play in the bearings and axially adjusting the position of the paddle.

Attached firmly to the end of the paddle shaft 61 is the hub 65 which carries a plate 66 to which is attached the drive pin 67. This drive pin 67 which is arranged to be parallel to the axis of rotation of paddle shaft 61, fits freely into a slot 68 in the plate 71 which is attached to the adapter 70, which is itself firmly attached to the inboard extremity of the probe 10. Thus, through the use of this pin and slot linkage, means is provided whereby an angular displacement of the paddle shaft 61 may produce an angular displacement of the probe 10 with less friction or backlash than is possible with spur gears or the like. By choosing the distance between the axis of the paddle shaft 61 and the axis of the drive pin 67 to be about twice the distance between the axis of the paddle shaft 61 and the axis of the probe 10 a mechanical advantage of about 3:1 can exist between the paddle shaft and the probe shaft. Such mechanical advantage increases the torque produced by the paddle on the probe and raises the power level of the instrument.

To prevent erroneous readings of the instrument under conditions of vibration or acceleration the assembly of parts of the probe 10 is statically balanced by a counterweight 72 carried by the adapter 70 and the assembly of parts on the paddle shaft 61 is statically balanced by the counterweight 68 carried on the hub 65.

In order to prevent condensation within the assembly which might result in the formation of ice and cause the mechanism to jam, an electrically operated heating element 80 is installed in a groove in the plate 81. A temperature sensitive switch 82 is connected in series with the heating element to prevent the instrument becoming overheated.

In order to provide a remote indication of the angular position of the probe the plate 66 carries sliding contacts 97 and 98 which are insulated from itself and from each other. These contacts ride on the surfaces of the electrically separate potentiometers 16 and 17 so that if a voltage is impressed across one or the other of these potentiometers then the voltage between the sliding contact and one end of that potentiometer is a measure of the angular position of the probe.

The cover 90 fits tightly over a rubber gasket 91 fitted in a groove in the housing 34 so that an airtight seal is obtained.

For simplicity, the connecting wires to the potentiometers, sliding contacts and heaters have been omitted. By means of the connector 92 and the multi-conductor cable 93 electrical connections are made to the instrument. The plate 94 is arranged to clamp firmly the cable 93 and with the aid of suitable sealing compound also make an airtight seal at the point where the electrical wires enter the housing 34.

Also omitted from the drawings and from the description are most of the assembly screws, rivets and dowels, but it will be understood that they will be supplied wherever desirable or necessary.

The operation of the preferred and illustrative embodiment may be summarized as follows. The airstream direction detector is mounted by means of the flange 95 to a suitable mounting surface on the airplane so that the slots 12 are into the airstream and on the leading side of the probe. A groove 96 is provided for a gasket, though other means of sealing the mounting may be used.

If the direction of the local airstream changes then the pressure at one slot 12 is different from that at the other by means of the passageways in the probe and the orifices 22. This differential pressure is communicated, through the filter assembly 40 to the opposite sides of the paddle 60. This differential pressure will cause the paddle 60 to rotate, and as soon as rotation starts air enters the higher pressure slot 12, flows down one of the passages 13, through the orifices 22 and 41 and through the filter 42, then through the slot 43 in the filter assembly and out into one side of the paddle chamber 50 through the opening 44 in the block 33. This procedure is reversed for air leaving the other side of the paddle chamber. The differential pressure across the paddle 60 will cause rotation which in turn will produce a smaller rotation but greater torque of the probe shaft 10 by means of pin 67 and slot 68 linkage. The sense of the linkage is such as to turn the probe 10 in the correct direction to reduce the differential pressure at the slots to zero once more. In this condition the bisector of the acute angle between the slots is realigned with the direction of the local airflow. When this condition is re-established rotation ceases and airflow through the instrument ceases. As it rotates, the probe 10 carries with it the sliding contacts 97 and 98 so that if electrical connections are suitably made to the connector 92, a remote indication is obtained of the angular position of the probe 10, and hence the direction of the local airflow.

In one illustrative embodiment of this system one of the potentiometers 17 is connected electrically to a second potentiometer by means of an electrical servomotor which drives the sliding contact of this second potentiometer to a position which is electrically equivalent to the position of the contact 98. This electrical servomotor is also geared to the pointer of an indicator so that the pilot has a continuous indication of the angular position of the probe of the airstream direction detector and hence an indication which, in a suitable installation, is a function of the angle of attack of his aircraft.

This electrical servomotor which follows the output signal from the airstream direction detector may also operate switches which may control lights in a forward part of the airplane so that the angle of attack may be observed from the place at which the airplane is preparing to land.

By means of the trimmer contacts 100 at each end of each potentiometer the electrical center of each potentiometer is adjusted to coincide with the mechanical center of the angular travel of the probe.

Located on the mounting flange 95 are two dowel pins 99. At final assembly of the instrument the angular position of the adapter 70 on the probe 10 is adjusted so that when the airstream over the probe is at right angles to the line joining the dowel pins 96 then each of the sliding contacts 97 and 98 is in the electrical center of the potentiometer winding on which the contact rides.

By this procedure it is possible, utilizing the dowel pins 97 as a reference to mount the airstream direction detectors so that they may be readily interchanged without adjustment of themselves or the circuits to which they supply electrical information.

The invention in its broader aspects is not limited to the specific mechanisms shown and described but departures may be made therefrom within the scope of the accompanying claims without departing from the principles of the invention and without sacrificing its chief advantages.

What is claimed is:

1. An instrument for measuring the local airstream direction at a location on an aircraft comprising, a hollow rotatable probe member having a pair of longitudinally extending slots to be angularly positioned in the airstream, said probe member being longitudinally divided by a hollow diametral partition into two longitudinal passageways, each passageway being in communication with a longitudinal slot, an electrical heating element longitudinally disposed in the hollow diametral partition to heat the longitudinal slots and prevent the formation of ice, a fluid pressure paddle motor having a pivoted paddle freely movable within an air chamber, the air chamber being divided into a plurality of portions by the paddle, two of the portions being individually communicated with the two probe slots, a mechanical coupling between the probe shaft and the paddle, whereby a difference in air pressure on the probe slots causes a difference in air pressure in the chamber portions to swing the paddle and thereby cause a pressure equalizing movement of the probe.

2. An instrument as claimed in claim 1 in which a temperature responsive switch controlling the heater is mounted in the probe.

3. An instrument as claimed in claim 1 in which the paddle has clearance spacing it from the walls of the chamber in which it is pivoted whereby friction is eliminated and the combined pneumatic resistance of the slots and passageways is small compared with the internal resistance across the paddle.

4. An instrument as claimed in claim 3 in which the probe member and paddle member are individually pivoted between two plates forming the walls of the chamber, one of the plates being circumferentially grooved and provided with an electric resistance heater in the groove.

5. An instrument as claimed in claim 4 in which the grooved plate is also provided with an annular gasket and a sealing cover is provided to seal the inboard face of the instrument against leakage of air outwardly of the instrument.

6. An instrument as claimed in claim 3 in which a potentiometer is provided having a sliding contact mounted on and driven by the probe.

7. An instrument as claimed in claim 3 in which the mechanical coupling comprises a slotted arm carried by the probe which is apertured to receive a crank pin carried by the paddle shaft, and the crank engages the slotted arm.

8. An instrument as claimed in claim 3 in which two external dowel pins are carried by said chamber and the line joining the centers of said dowel pins has a known direction with respect to the local air stream direction, said dowel pins being engageable with corresponding dowel holes on the mounting surface of the aircraft whereby one instrument may be interchanged with another without subsequent adjustment of the instrument or of the system to which information is supplied.

References Cited in the file of this patent

UNITED STATES PATENTS

| | | |
|---|---|---|
| 2,358,804 | Holloman | Sept. 26, 1944 |
| 2,445,746 | Raspet | July 20, 1948 |
| 2,512,278 | Jones | June 20, 1950 |
| 2,524,747 | Ayers | Oct. 10, 1950 |
| 2,643,077 | Martin | June 23, 1953 |